US008620216B2

(12) United States Patent
Castrogiovanni et al.

(10) Patent No.: US 8,620,216 B2
(45) Date of Patent: Dec. 31, 2013

(54) SYSTEM AND METHOD FOR AUTOMATICALLY SWITCHING CONNECTION OF A WIRELESS INTERFACE

(75) Inventors: Pino Castrogiovanni, Turin (IT); Giovanni Malnati, Turin (IT); Giovanni Martini, Turin (IT)

(73) Assignee: Telecom Italia S.p.A., Milan (IT)

( * ) Notice: Subject to any disclaimer, the term of this patent is extended or adjusted under 35 U.S.C. 154(b) by 316 days.

(21) Appl. No.: 13/002,258

(22) PCT Filed: Jun. 30, 2008

(86) PCT No.: PCT/EP2008/058352
§ 371 (c)(1),
(2), (4) Date: Dec. 30, 2010

(87) PCT Pub. No.: WO2010/000293
PCT Pub. Date: Jan. 7, 2010

(65) Prior Publication Data
US 2011/0151788 A1    Jun. 23, 2011

(51) Int. Cl.
H04B 7/00    (2006.01)
H04B 5/00    (2006.01)

(52) U.S. Cl.
USPC ..... 455/41.2; 455/41.1; 455/41.3; 455/552.1; 455/553.1; 455/436; 455/439

(58) Field of Classification Search
USPC ........ 455/41.1, 41.2, 41.3, 552.1, 553.1, 436, 455/439
See application file for complete search history.

(56) References Cited

U.S. PATENT DOCUMENTS

| | | | |
|---|---|---|---|
| 6,834,192 B1* | 12/2004 | Watanabe et al. | 455/444 |
| 2002/0168970 A1 | 11/2002 | Myojo | |
| 2003/0114104 A1* | 6/2003 | Want et al. | 455/39 |
| 2003/0223604 A1 | 12/2003 | Nakagawa | |
| 2004/0014422 A1* | 1/2004 | Kallio | 455/41.1 |
| 2004/0092265 A1* | 5/2004 | Chitrapu et al. | 455/436 |
| 2005/0107084 A1* | 5/2005 | Dyck et al. | 455/436 |
| 2007/0249286 A1 | 10/2007 | Ma et al. | |
| 2008/0016537 A1 | 1/2008 | Little et al. | |
| 2008/0248751 A1* | 10/2008 | Pirzada et al. | 455/41.2 |
| 2008/0293420 A1* | 11/2008 | Jang et al. | 455/444 |

FOREIGN PATENT DOCUMENTS

| | | |
|---|---|---|
| EP | 1404067 A2 | 3/2004 |
| GB | 2308775 A | 7/1997 |
| WO | 2006/120582 A1 | 11/2006 |

OTHER PUBLICATIONS

International Search Report dtd Apr. 6, 2009, PCT/EP2008/058352.

* cited by examiner

Primary Examiner — Wen Huang
(74) Attorney, Agent, or Firm — Banner & Witcoff, Ltd.

(57) ABSTRACT

A system is provided including a device and a control module. The device has a first wireless interface for connecting to a first further device and a second wireless interface for connecting to the control module. The first wireless interface is suitable for detecting that a second further device is located within its coverage area. The second wireless interface is suitable for communicating to the control module that the second further device is located within the coverage area. The control module is suitable for executing a service logic and for transmitting to the second wireless interface a command to disconnect the first wireless interface from the first further device. The first wireless interface is configured for executing the command, thus automatically disconnecting from the first further device, and for connecting the device to the second further device.

18 Claims, 3 Drawing Sheets

SYSTEM AND METHOD FOR AUTOMATICALLY SWITCHING CONNECTION OF A WIRELESS INTERFACE

CROSS REFERENCE TO RELATED APPLICATIONS:

This is a U.S. National Phase Application under 35 U.S.C. §371 of International Application No. PCT/EP2008/058352, filed Jun. 30, 2008, which was published Under PCT Article 21(2), the entire contents of which are incorporated herein by reference.

TECHNICAL FIELD

The present invention generally relates to the field of wireless communications. In particular, the present invention relates to a system and method for automatically switching connection of a wireless interface.

BACKGROUND ART

In the art, different wireless communication technologies are known, which allow to activate wireless connections between two or more devices having reciprocal maximum distances of some tens of metres. Examples of such known wireless communication technologies are Bluetooth, Wi-Fi, Wibree, Zigbee, etc.

The most widespread applications of these wireless communication technologies are, for instance, connecting different computers within an office, connecting a computer to its peripherals (e.g. mouse, keyboard, modem, printer), connecting a digital camera to a computer, connecting a mobile phone to a headset, and so on.

For communicating by means of a wireless communication technology, a device must be provided with a suitable wireless interface. The wireless interface may be either integrated within the device, or it may be implemented as a stand-alone module which may be releasably connected to the device (such as for instance a "Bluetooth dongle", which may be releasably connected to a computer by means of its USB port).

The mechanism allowing two or more devices provided with respective wireless interfaces to connect each other depends of the specific wireless communication technology.

For instance, in case of Bluetooth, a Bluetooth interface is typically configured to perform a so-called "discovery", i.e. an operation of detecting whether further Bluetooth interfaces willing to activate a wireless connection are located within its coverage area. For signalling its presence and willingness to activate a wireless connection, each of the further Bluetooth interfaces broadcasts information comprising its identifier, Bluetooth address and supported Bluetooth profile(s). In particular, each Bluetooth profile indicates the operations that the device including the further Bluetooth interface may perform by using the wireless connection supported by the further Bluetooth interface. For instance, the "Bluetooth Headset Profile", which is typically supported by headsets and mobile phones, provides the capability of receiving and transmitting voice signals encoded according to PCM ("Pulse Code Modulation").

When, by means of a discovery, a first Bluetooth interface detects a second Bluetooth interface willing to activate a wireless connection and supporting a compatible Bluetooth profile, it preferably performs an authentication of the second Bluetooth interface, upon which the wireless connection is activated.

Further, Bluetooth provides a so-called "pairing" mechanism. In particular, according to the pairing mechanism, when a first Bluetooth interface of a first device (e.g. a headset) detects a second Bluetooth interface of a second device (e.g. a mobile phone) willing to activate a wireless connection and supporting a compatible Bluetooth profile (e.g. the Bluetooth headset profile), the first Bluetooth interface sends a pairing request to the second Bluetooth interface, which accordingly instructs the second device to present its user with a request to insert a PIN code for authentication. If the first and second devices belong to different users, the PIN code is typically agreed by the users before the pairing procedure is started and is explicitly inserted at the first device before sending the pairing request. On the other hand, if both devices belong to a same user or the first device doesn't include any input means allowing the user to insert the PIN code, the PIN code may be predefined by the manufacturer of the first device, and then communicated to the user e.g. by reporting it on the operating manual of the first device.

If the authentication succeeds, the first Bluetooth interface records the second Bluetooth interface as a "trusted" interface and vice versa. Both the first and the second device use the PIN code for generating a secure key that the they store and use for automatically authenticating each other, thus avoiding asking any further manual intervention by the user.

A Bluetooth interface may have more than one "trusted" interface, each one being recorded at the Bluetooth interface by means of a respective pairing procedure. The release of a connection between "trusted" interfaces typically has to be manually performed by the user.

US 2007/0249286 discloses a method and apparatus for managing the establishment of a wireless connection between an instrument host and a non-fixed device. The method comprises acquiring the non-fixed medical device address over a fixed wire by replacing the traditional wireless searching mechanism. The method also comprises providing an authentication mechanism between the instrument host and the non-fixed device, for example, across a wireless communications network.

US 2008/0016537 discloses a security token access device, a user device such as a computing device or communications device, and a method for managing multiple connections between multiple user devices and the access device. The access device maintains connection information, including security information, for each user device securely paired with the access device. Each time a new user device is paired with the access device, the access device transmits a notification to the user devices already paired to the user device. A user may provide instructions to the access device to terminate a pairing with one of the user devices by overwriting at least a portion of the connection information associated with the designated user device. A user device may further request a listing of all user devices currently paired with the access device.

WO 2006/120582 discloses a wireless communication between a mobile telephone handset and a headset worn by a person that uses the handset, through a first, wireless link such as Bluetooth. A second communication link is established by passing electrical currents between the handset and the headset through the body of the person. Communication through the second link is used to control operation of the first link.

SUMMARY OF THE INVENTION

The Applicant has noticed that a user having a device with a wireless interface may use his device for connecting to different further devices with respective further wireless interfaces.

For instance, a user having a headset with a Bluetooth interface may connect his headset both to his mobile phone (provided with a first further Bluetooth interface) or to his computer (provided with a second further Bluetooth interface). In this way, the user may use the headset either for making calls with his mobile phone, or e.g. for making calls by means of a software telephony application run on his computer.

To this purpose, the headset may be permanently connected both to the mobile phone and to the computer by means of respective wireless connections. For instance, the known Multipoint Bluetooth devices include a special type of Bluetooth interface, which is capable of keeping active different wireless connections with different Bluetooth interfaces located in its coverage area at the same time. Alternatively, the user may manually activate only the wireless connection between the headset and the device he intends to use. Therefore, if he wishes to make calls with his mobile phone, he manually connects the headset to the mobile phone. Subsequently, if the wishes to make calls by means of the software telephony application run on his computer, he manually disconnects the headset from the mobile phone and then manually connects the headset to the computer.

The Applicant has perceived that it is desirable providing a device having a wireless interface with the capability of, when connected to a first further wireless interface, disconnecting from the first further wireless interface and connecting to a second further wireless interface without requiring any manual intervention by the user of the device.

This would allow service providers to deploy new data services and/or telephone services based on such device.

For instance, in the above exemplary situation of a headset connectable both to a mobile phone and a computer, a headset provided with the above capability would advantageously allow to implement a service wherein, when the headset is connected to the mobile phone, the headset automatically switches its connection to the computer when the software telephony application run on the computer notifies the user that an incoming call is being received.

On the other hand, by providing a portable PC with a Bluetooth interface having the above capability, a service could be provided wherein the portable PC, when used in a work environment wherein different printers provided with respective Bluetooth interfaces are located, automatically connects to the nearest printer.

Therefore, the Applicant has tackled the problem of providing a system comprising a device with a wireless interface which is suitable for, when the wireless interface is connected to a first further wireless interface, automatically switching connection of the wireless interface, i.e. which is suitable for disconnecting the wireless interface from the first further wireless interface and connecting it to a second further wireless interface, without requiring any manual intervention by the user of the device.

According to a first aspect, the present invention provides a system comprising a device and a control module, the device having a first wireless interface suitable for connecting the device to a first further device and a second wireless interface suitable for connecting the device to the control module, wherein:
  the first wireless interface is suitable for detecting that a second further device is located within its coverage area and for communicating it to the second wireless interface;
  the second wireless interface is suitable for transmitting to the control module a message indicating that the second further device is located within the coverage area;
  the control module is suitable for executing a service logic and, according to a result of the executing, transmitting to the second wireless interface a command to disconnect the first wireless interface from the first further device; and
  the first wireless interface is further configured for receiving the command from the second wireless interface, for executing the command thus automatically disconnecting the device from the first further device and for connecting the device to the second further device.

Preferably, the first wireless interface is further configured for accepting, as a consequence of the disconnecting, a request of connection received from the second further device, thus connecting the device to the second further device.

Profitably, the control module is further configured to store one or more of: an identifier of the device, a first wireless address of the first further device and a date and time at which a connection between the first wireless interface and the first further device has been activated.

Preferably, the second wireless interface is further configured to include in the message one or more of: an identifier of the device, a second wireless address of the second further device and a date and time at which the second further device has been detected by the first wireless interface.

Profitably, the first wireless interface is further configured to periodically receive requests of connection from the second further device, and not to accept the requests of connection while the first wireless interface is connected to the first further device.

Preferably, the control module is suitable for determining that an event suitable to trigger disconnection of the device from the first further device and connection to the second further device has occurred, and to transmit the command as a consequence of the occurring.

Preferably, the second wireless interface is further suitable for, after the device has been connected to the second further device, transmitting to the control module a further message informing the control module that the device is presently connected to the second further device.

According to a second aspect, the present invention provides a device having a first wireless interface suitable for connecting the device to a first further device and a second wireless interface suitable for connecting the device to a control module, wherein:
  the first wireless interface is suitable for detecting that a second further device is located within its coverage area and for communicating it to the second wireless interface;
  the second wireless interface is suitable for transmitting to the control module a message indicating that the second further device is located within the coverage area;
  the second wireless interface is suitable for receiving from the control module a command to disconnect the first wireless interface from the first further device, the command being transmitted from the control module according to a result of executing a service logic; and
  the first wireless interface is further configured for receiving the command from the second wireless interface, for executing the command thus automatically disconnecting the device from the first further device and for accepting, as a consequence of the disconnecting, a request of connection received from the second further device, thus connecting the device to the second further device.

According to a third aspect, the present invention provides a method for, when a first wireless interface of a device is connected to a first further device, automatically disconnecting the first wireless interface from the first further device and connecting it to a second further device, the method comprising:

a) providing the device with a second wireless interface suitable for connecting the device with a control module;
b) at the first wireless interface, detecting that the second further device is located within its coverage area, and communicating it to the second wireless interface;
c) transmitting from the second wireless interface to the control module a message indicating that the second further device is located within the coverage area;
d) at the control module, executing a service logic and, according to a result of the executing, transmitting to the second wireless interface a command to disconnect the first wireless interface from the first further device; and
e) at the first wireless interface, receiving the command from the second wireless interface, executing the command thus automatically disconnecting the device from the first further device, and accepting, as a consequence of the disconnecting, a request of connection received from the second further device, thus connecting the device to the second further device.

Preferably, the method further comprises, before step b), recording the first further device and the second further device as trusted devices at the first wireless interface.

Profitably, the method further comprises, before step b), storing at the control module one or more of: an identifier of the device, a first wireless address of the first further device and a date and time at which a connection between the first wireless interface and the first further device has been activated.

Preferably, step c) comprises including in the message one or more of: an identifier of the device, a second wireless address of the second further device and a date and time at which the second further device has been detected by the first wireless interface.

Profitably, the method further comprises, after step c) and before step e), periodically receiving requests of connection at the first wireless interface from the second further device, and not accepting the requests of connection.

Preferably, step c) comprises determining that an event suitable to trigger disconnection of the device from the first further device and connection to the second further device has occurred.

Preferably, the method further comprises, after step e), transmitting from the second wireless interface to the control module a further message informing the control module that the device is presently connected to the second further device.

BRIEF DESCRIPTION OF THE DRAWINGS

The present invention will become more clear from the following detailed description of preferred embodiments, given by way of example and not of limitation, to be read by referring to the accompanying drawings, wherein.

DETAILED DESCRIPTION OF PREFERRED EMBODIMENTS OF THE INVENTION

Figure 1:
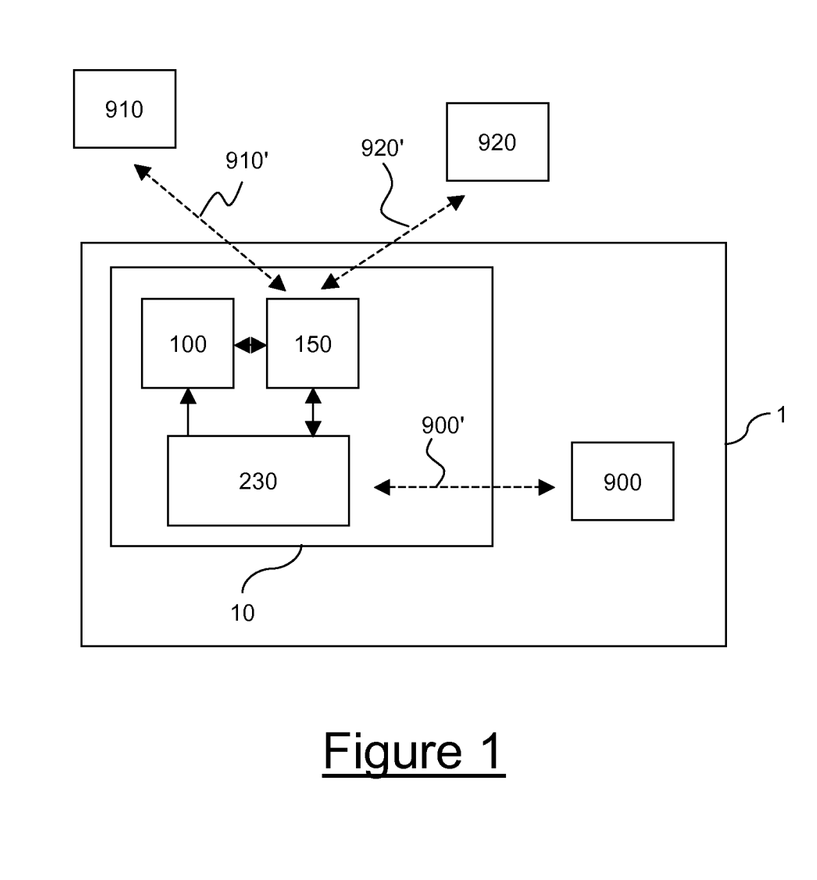
FIG. 1 schematically shows a system according to an embodiment of the present invention.

FIG. 1 schematically shows a system 1 according to an embodiment of the present invention.

The system 1 preferably comprises a device 10 and a control module 900. Preferably, the device 10 comprises a user input-output module 100, a first wireless module 150 and a second wireless module 230. The device 10 may comprise other modules or components, which are not shown in FIG. 1 since they are not relevant to the present description.

Preferably, the first wireless module 150 is suitable for connecting the device 10 to one of a first further device 910 and a second further device 920 through one of a first wireless connection 910' and a second wireless connection 920'. Further, preferably, the second wireless module 230 is suitable for connecting the device 10 to the control module 900 through a third wireless connection 900'.

For instance, the device 10 may be a headset, while the first further device 910 may be a mobile phone and the second further device 920 may be a computer. Alternatively, the device 10 may be a computer, while the first further device 910 may be a first printer and the second further device 920 may be a second printer.

Although in FIG. 1 the control module 900 is shown as a stand-alone module, according to advantageous embodiments not shown in the drawings, the control module 900 may be integral either with the first further device 910, or the second further device 920, or the device 10 itself. Preferably, as it will be discussed in further detail by referring to FIG. 3, the control module 900 is suitable for executing a service logic and, according to the outcome of the service logic, to control the device 10 (and, in particular, the first wireless module 150) through the second wireless module 230.

Figure 2:
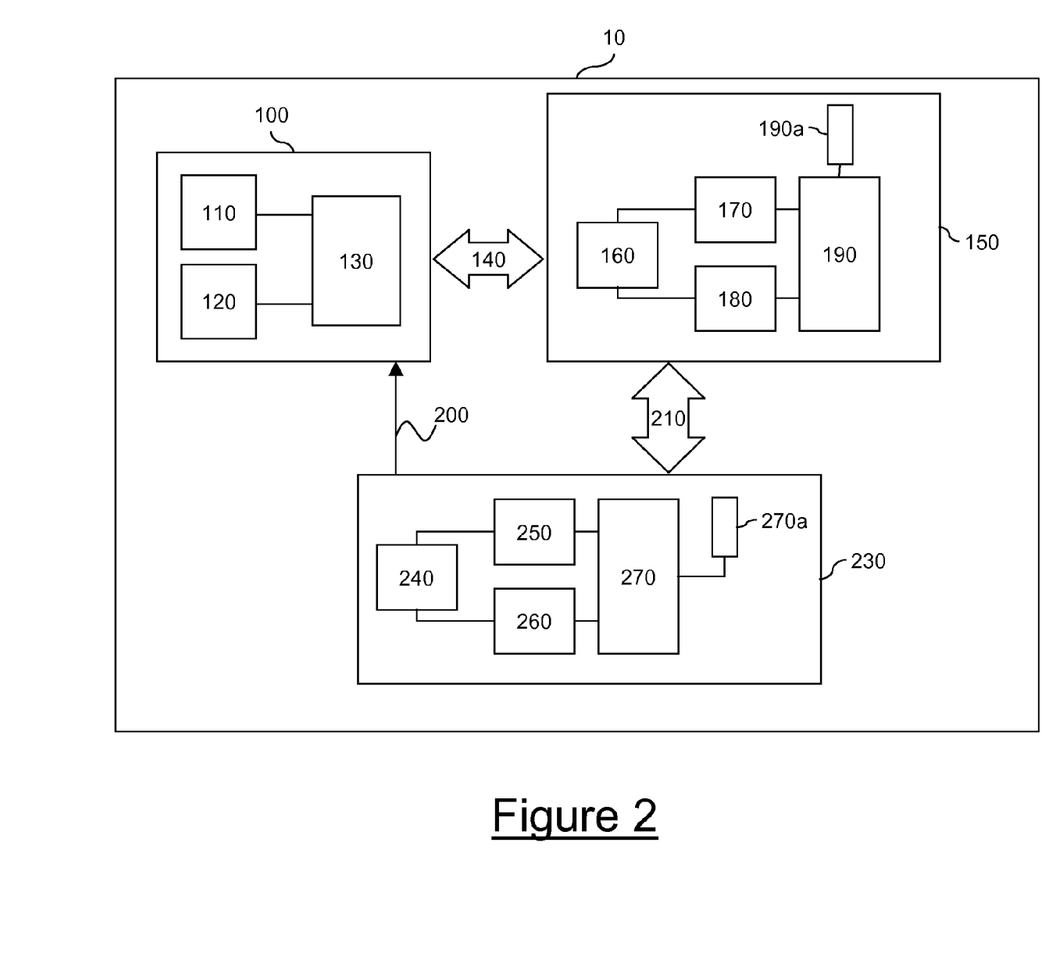
FIG. 2 shows in further detail the structure of the device included in the system of FIG. 1.

By referring to FIG. 2, the structure of the device 10 according to a first embodiment will be now described in further detail.

According to advantageous embodiments of the present invention, the first wireless module 150 preferably comprises a first microcontroller 160, a first temporary memory 170 (implemented e.g. as a RAM), a first permanent memory 180 (implemented e.g. as a ROM) and a first wireless interface 190 provided with a first antenna 190a. Preferably, the first wireless interface 190 with the first antenna 190a is suitable for being connected to a corresponding further wireless interface (not shown in the drawings) of the first further device 910 by means of the first wireless connection 910', thus connecting the device 10 to the first further device 910. Preferably, the first wireless interface 190 with the first antenna 190a is also suitable for being connected to a corresponding further wireless interface (not shown in the drawings) of the second further device 920 by means of the second wireless connection 920', thus connecting the device 10 to the second further device 920.

According to advantageous embodiments of the present invention, the second wireless module 230 preferably comprises a second microprocessor 240, a second temporary memory 250 (implemented e.g. as a RAM), a second permanent memory 260 (implemented e.g. as a ROM) and a second wireless interface 270 provided with a second antenna 270a. Preferably, the second wireless interface 270 with the second antenna 270a is suitable for being connected to a corresponding further wireless interface (not shown in the drawings) of the control module 900 by means of the third wireless connection 900', for connecting the device 10 to the control module 900.

Although in FIG. 2 the first temporary memory 170 and the second temporary memory 250 are shown as separate memories, according to advantageous embodiments not shown in the drawings they may be implemented as different areas of a physically unique temporary memory. Similarly, although in FIG. 2 the first permanent memory 180 and the second permanent memory 260 are shown as separate memories, according to advantageous embodiments not shown in the drawings they may be implemented as different areas of a physically unique permanent memory.

Preferably, the first wireless interface 190 and the second wireless interface 270 are based on different wireless communication technologies. For instance, the first wireless interface 190 may be based on Bluetooth (thus being suitable for transmitting and receiving radio signals in the 2.4 GHz Bluetooth base-band), while the second wireless interface 270 may be based on Zigbee (thus being suitable for transmitting and receiving radio signals in the 2.4 GHz Zigbee base-band). Preferably, the first wireless interface 190 is suitable for supporting the above mentioned Bluetooth Headset Profile. Further, preferably, the wireless interfaces (not shown in the drawings) of the first further device 910 and second further device 920 are based on Bluetooth, whereas the wireless interface (not shown in the drawings) of the control module 900 is based on Zigbee.

Alternatively, the first wireless interface 190 and the second wireless interface 270 may be based on a same wireless communication technology, e.g. Bluetooth, Zigbee, Wi-Fi and so on. For instance, in case both the first wireless interface 190 and the second wireless interface 270 are based on Bluetooth, they preferably support different Bluetooth profiles. For instance, the first wireless interface 190 may support the above mentioned Bluetooth Headset Profile, whereas the second wireless interface 270 may support a Bluetooth Serial Profile. Preferably, the first wireless module 150 is connected to the second wireless module 230 by means of a first link 210. Preferably, if the first wireless interface 190 included in the first wireless module 150 is based on Bluetooth and the second wireless interface 270 included in the second wireless module 230 is based on Zigbee, the first link 210 is a serial link. For example, the first link 210 may be implemented as a UART ("Universal Asynchronous Receiver/Transmitter").

Preferably, the user input-output module 100 comprises a user input block 110 by means of which the user may input data into the device 10. For instance, if the device 10 is a headset, the user input block 110 may comprise a microphone.

Further, preferably, the user input-output module 100 comprises a user output block 120, by means of which the device 10 may output data to the user. For instance, if the device 10 is a headset, the user output block 120 may comprise a speaker.

The user input-output module 100 preferably comprises also a codec 130. Preferably, the codec 130 decodes data received from the first wireless module 150 so that they can be output by the user output block 120. Besides, the codec 130 encodes data input by the user through the user input block 110 so that they can be forwarded to and processed by the first wireless module 150. For instance, if the device 10 is a headset (and therefore the blocks 110 and 120 comprise a microphone and a speaker, respectively), the codec PCM preferably is suitable to perform a PCM ("Pulse Code Modulation") on voice data input by the user through the microphone 110.

The user input-output module 100 is preferably connected to the first wireless module 150 by means of a second link 140 and to the second wireless module 230 by means of a third link 200. Preferably, the third link 200 is implemented as a synchronous serial interface, such as for instance an SPI (Serial Peripheral Interface).

The user input-output module 100, the first wireless module 150 and the second wireless module 230 are preferably enclosed in a same package.

Alternatively, the user input-output module 100 may be enclosed in a first package, while the first wireless module 150 and the second wireless module 230 may be enclosed in a second package, the first and second package being connected by the second and third links 140 and 200. Alternatively, the first package may include only the user input block 110 and the user output block 120, while the PCM codec 130 is enclosed within the second package and is connected by a wire to the first package. This advantageously provides a first package with a particularly small size. For instance, in case the device 10 is a headset, the first package advantageously includes only a microphone 110 and a speaker 120, so that it may have the shape and size e.g. of a hearing aid device, which may be advantageously placed in the user's ear.

Figure 3:
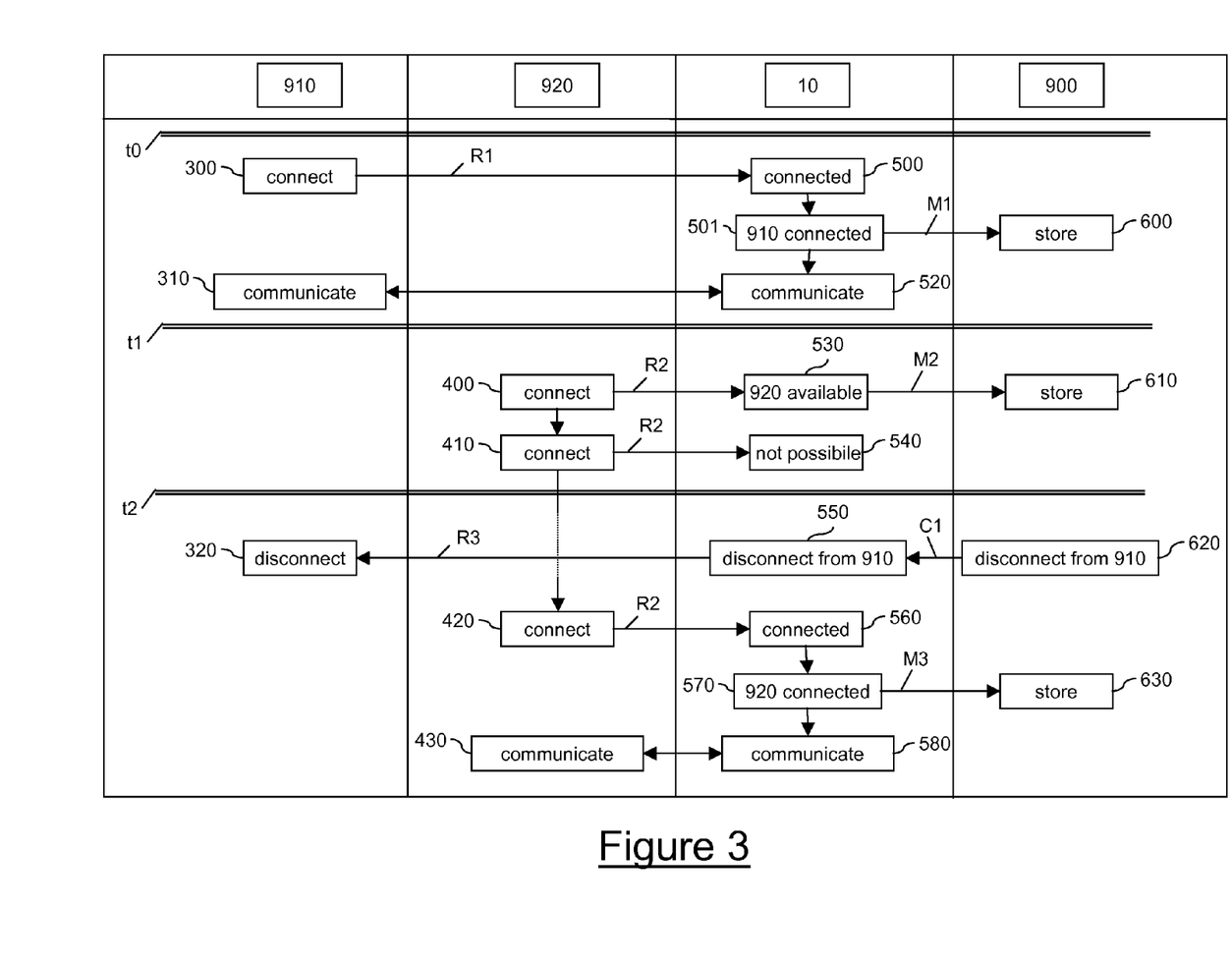
FIG. 3 is a diagram showing the operation of the system of FIG. 1, according to an embodiment of the present invention.

By referring to FIG. 3, the operation of the system 1 of FIG. 1 will be now described in detail.

It is assumed that a user has the device 10 (e.g. a headset), which may be connected either to the first further device 910 (e.g. his mobile phone) or to the second further device 920 (e.g. his computer).

For simplicity, it is assumed that the first wireless interface 190 and the wireless interfaces of the first further device 910 and second further device 920 are Bluetooth interfaces. Besides, it is assumed that, after purchasing the devices 10, 910 and 920, the user has performed the above mentioned pairing procedure, thus recording the wireless interfaces of the first further device 910 and second further device 920 as "trusted" interfaces at the first wireless interface 190, and recording the first wireless interface 190 as a "trusted" interface at the wireless interfaces of the first further device 910 and second further device 920.

Further, it is assumed that the user has subscribed a service according to which, when the device 10 is connected to the first further device 910 and a predetermined event occurs, the device 10 is automatically disconnected from the first further device 910 and automatically connected to the second further device 920. Examples of such services have been reported above, i.e.: automatically disconnecting a headset connected to a mobile phone and automatically connecting it to a computer when an incoming call is detected by the telephone software application running on the computer, or automatically disconnecting a computer connected to a first printer and automatically connecting it to a second printer when the detected position of the computer is nearer to the second printer. The operation of subscribing the service will not be described, since it is not relevant to the present description.

It is assumed that, at a certain time t0 the user switches on the device 10, and that in the meanwhile the first further device 910 is located within the coverage area of the first wireless interface 190, while the second further device 920 is located outside the coverage area of the first wireless interface 190. Besides, it is assumed that the control module 900 is located within the coverage area of the second wireless interface 270.

Further, it is assumed that the user activates the subscribed service. The operation of activating the subscribed service will not be described in detail, since it is not relevant to the present description. The activation of the subscribed service induces the control device 900 to execute the service logic suitable for implementing the subscribed service.

When the user switches on the device 10, the first wireless interface 910 also switches on. The wireless interface of the first further device 910 then detects it and transmits to it a request of connection R1 (step 300). Since the wireless interface of the first further device 910 is a "trusted" interface at the first wireless interface 190, the first wireless interface 190 accepts the request of connection (step 500), thus allowing activation of the first wireless connection 910'.

Then, preferably, the first wireless module 150 communicates to the second wireless module 230 that the first wireless connection 910' has been activated.

Then, the wireless module 230 transmits to the control module 900 a message M1 informing the control module 900 that the device 10 is presently connected to the first further device 910 (step 501). Preferably, the message M1 comprises one or more of the following information: an identifier of the device 10, a wireless address (e.g. a MAC address) of the wireless interface of the first further device 910, and date and time at which the request of connection R1 has been received at the device 10. The control module 900 receives such a message M1 and stores its content (step 600).

Therefore, after the first wireless connection 910' has been activated, the device 10 and the first further device 910 may communicate (steps 310 and 520). In particular, for instance, if the device 10 is a headset, the first further device 910 is a mobile phone and their wireless interfaces are Bluetooth interfaces, the communication between the device 10 and the first further device 910 takes place according to the above mentioned Bluetooth Headset Profile, i.e. the device 10 and the first further device 910 exchange voice signals encoded according to PCM.

Then, at a given time t1 also the second further device 920 enters the coverage area of the first wireless interface 190. For instance, if the second further device 920 is the computer of the user, which is located e.g. in the user's office, the second further device 920 enters the coverage area of the first wireless interface 190 when the user, with his headset 10 and his mobile phone 910, enters his office (if the computer is switched on).

When the second further device 920 enters the coverage area of the first wireless interface 190, it preferably transmits to it a request of connection R2 (step 400).

Preferably, the device 10 receives the request of connection R2 from the second further device 920 by means of the first wireless module 150, which forwards it to the second wireless module 230.

Then, preferably, the second wireless module 230 transmits to the control module 900 a message M2 informing the control module 900 that the second further device 920 is now located within the coverage area of the first wireless interface 190, and is therefore available for activating a connection with it (step 530). Preferably, the message M2 comprises one or more of the following information: an identifier of the device 10, a wireless address (e.g. a MAC address) of the wireless interface of the second further device 920, and date and time at which the request of connection R2 has been received at the device 10. The control module 900 receives such a message M2 and stores its content (step 610). Further, preferably, during step 530 the device 10 does not accept the request of connection R2 received from the second further device 920.

Afterwards, assuming that the second further device 920 does not exit the coverage area of the first wireless interface 190, it preferably periodically repeats the transmission of the request of connection R2 to the device 10 (step 410). However, the device 10 continues not accepting such a request of connection R2 (step 540).

Then, at a given time t2, the control module 900, which is running the service logic controlling the service subscribed by the user, determines that the event suitable to trigger disconnection of the device 10 from the first further device 910 and connection to the second further device 920 has occurred. Examples of such event are e.g., by referring to the above examples, detection of an incoming call by the telephone software application running on the computer, or detection of a nearer printer.

Accordingly, the control module 900 transmits to the second wireless module 230 of the device 10 a command C1 to disconnect from the first further device 910 (step 620). Upon reception of the command C1, the second wireless module 230 forwards it to the first wireless module 150, which then transmits a request of disconnection R3 to the first further device 910 (step 320), so the first further device 910 disconnects from the device 10 (step 320).

Assuming that at t2 the second further device 920 is still located within the coverage area of the first wireless interface 190, the second further device 920 is still periodically repeating the transmission of the request of connection R2 to the device 10.

Therefore, the first time the first wireless module 150 receives from the second further device 920 the request of connection R2 after the first wireless connection 910' with the first further device 910 has been deactivated (step 420), since the wireless interface of the second further device 920 is a "trusted" interface at the first wireless interface 190, the first wireless interface 190 accepts the request of connection R2 (step 560), thus allowing activation of the second wireless connection 920'.

Then, preferably, the first wireless module 150 communicates to the second wireless module 230 that the second wireless connection 920' has been activated.

Therefore, the wireless module 230 transmits to the control module 900 a message M3 informing the control module 900 that the device 10 is presently connected to the second further device 920 (step 570). Preferably, the message M3 comprises one or more of the following information: an identifier of the device 10, a wireless address of the wireless interface of the second further device 920, and date and time at which the accepted request of connection R2 has been received at the device 10. The control module 900 receives such a message M3 and stores its content (step 630).

Therefore, after the second wireless connection 920' has been activated, the device 10 and the second further device 920 may communicate (steps 430 and 580). In particular, for instance, if the device 10 is a headset, the second further device 920 is a computer and their wireless interfaces are Bluetooth interfaces, the device 10 preferably receives from the second further device 920 the streaming of an audio file.

The communication between the device 10 and the second further device 920 may terminate when one of the following events occurs:

- the second further device 920 exits the coverage area of the first wireless interface 190, thus inducing a break of the second wireless connection 920';
- the service application executed by the control module 900 determines that an event occurred which triggers the disconnection of the device 10 from the second further device 920, and possibly the connection of the device 10 again to the first further device 910; or
- the user decides to manually deactivate the second wireless connection 920' (for instance, if the user wishes to switch off the device 10, or if he wishes to connect again the device 10 to the first further device 910, but the subscribed service does not provide any predefined event triggering such a switch).

Therefore, the system described above advantageously allows, when the first wireless interface 190 is connected to the first further device 910 (namely, to its wireless interface), to automatically switch connection of the first wireless interface 190, i.e. to disconnect the first wireless interface 190 from the first further device 910 (namely, from its wireless interface) and connect it to the second further device 920 (namely, to its wireless interface), without requiring any manual intervention by the user of the device 10.

Indeed, the device 10 (in particular, its first wireless interface 190) is advantageously automatically controlled by the service logic run on the control device 900. Since the wireless interface of the second further device 920 is recorded as a "trusted" interface at the first wireless interface 190, the switch of the connection only requires that the control device 900 instructs the first wireless interface 190 to disconnect from the first further device 910. This operation is automatically performed by the system, since it is based on an exchange of information between the device 10 (in particular, its second wireless module 230) and the control module 900, without requiring any intervention by the user. Then, when the first wireless interface 190 is disconnected from the first further device 910, as soon as it receives a request for connection R2 from the wireless interface of the second further device 920, it automatically accepts it, thus allowing the device 10 to be connected to the second further device 920. Advantageously, this operation can be automatically performed by the system, since it is based on an exchange of information between the first wireless interface 190 and the wireless interface of the second further device 920.

The invention claimed is:

1. A system comprising:
   a device; and
   a controller, wherein:
   said device has a first wireless interface configured to connect said device to a first further device and a second wireless interface configured to connect said device to said controller,
   said first wireless interface is configured to detect that a second further device is located within a coverage area of said first wireless interface and to communicate that the second further device is located within the coverage area to said second wireless interface;
   said second wireless interface is configured to transmit a message indicating that said second further device is located within the coverage area to said controller;
   said controller is configured to execute a service logic and, according to a result thereof, transmit to said second wireless interface a command to disconnect said first wireless interface from said first further device; and
   said first wireless interface is further configured to receive said command from said second wireless interface, execute said command to disconnect said device from said first further device and connect said device to said second further device.

2. The system according to claim 1, wherein said first wireless interface is further configured, in response to said disconnecting, to accept a connection request received from said second further device to connect said device to said second further device.

3. The system according to claim 1, wherein said controller is further configured to store one or more of: an identifier of said device, a wireless address of said first further device and a date and time at which a connection between said first wireless interface and said first further device has been activated.

4. The system according to claim 1, wherein said second wireless interface is further configured to include in said message one or more of: an identifier of said device, a wireless address of said second further device and a date and time at which said second further device has been detected by said first wireless interface.

5. The system according to claim 1, wherein said first wireless interface is further configured to periodically receive connection requests from said second further device, and not to accept said requests of connection while said first wireless interface is connected to said first further device.

6. The system according to claim 1, wherein said controller is configured to determine that an event suitable to trigger disconnection of said device from said first further device and connection of said device to said second further device has occurred, and to transmit said command responsive to the event occurring.

7. The system according claim 1, wherein said second wireless interface is further configured, after said device has been connected to said second further device, to transmit a further message informing said controller that said device is presently connected to said second further device.

8. The system according to claim 1, wherein:
   said connection between said device and said first further device comprises a subscribed service having a predefined disconnection trigger event;
   said first wireless interface is configured to periodically receive requests from said second further device to connect to said device and to reject said requests to connect in response to determining that the predefined disconnection trigger event has not occurred.

9. A device comprising:
   a first wireless interface configured to connect said device to a first further device; and
   a second wireless interface configured to connect said device to a controller, wherein:
   said first wireless interface is configured to detect that a second further device is located within a coverage area of said first wireless interface and to communicate that the second further device is located within the coverage area to said second wireless interface;
   said second wireless interface is configured to transmit a message indicating that said second further device is located within the coverage area to said controller;
   said second wireless interface is configured to receive a command to disconnect said first wireless interface from said first further device from said controller; and
   said first wireless interface is further configured to receive said command from said second wireless interface, execute said command to disconnect said device from said first further device and responsive to said disconnecting, accept a connection request received from said second further device to connect said device to said second further device.

10. A method for, when a first wireless interface of a device is connected to a first further device, disconnecting said first wireless interface from said first further device and connecting the first wireless interface to a second further device, said method comprising steps of:
    a) providing said device with a second wireless interface configured to connect said device with a controller;
    b) at said first wireless interface, detecting that said second further device is located within a coverage area of the first wireless interface, and communicating that the second further device is located within the coverage area to said second wireless interface;

c) transmitting from said second wireless interface to said controller a message indicating that said second further device is located within the coverage area;

d) at said controller, executing a service logic and, according to a result thereof, transmitting to said second wireless interface a command to disconnect said first wireless interface from said first further device; and e) at said first wireless interface, receiving said command from said second wireless interface, executing said command to disconnect said device from said first further device, and accepting, in response to said disconnecting, a connection request received from said second further device to connect said device to said second further device.

11. The method according to claim 10, further comprising before said detecting step recording said first further device and said second further device as trusted devices at said first wireless interface.

12. The method according to claim 10, further comprising before said step b), storing at said controller one or more of: an identifier of said device, a first wireless address of said first further device and a date and time at which a connection between said first wireless interface and said first further device has been activated.

13. The method according to claim 10, wherein said step c) comprises including in said message one or more of: an identifier of said device, a second wireless address of said second further device and a date and time at which said second further device has been detected by said first wireless interface.

14. The method according to claim 10, further comprising after said step c) and before said step e), periodically receiving connection requests at said first wireless interface from said second further device, and not accepting said connection requests.

15. The method according to claim 10, wherein said step c) comprises determining that an event configured to trigger disconnection of said device from said first further device and connection of said device to said second further device has occurred.

16. The method according to claim 10, further comprising after said step e), transmitting from said second wireless interface to said controller a further message informing said controller that said device is presently connected to said second further device.

17. The system according to claim 8, wherein:
said controller is configured to transmit said command to disconnect said first wireless interface from said first further device in response to determining that the predefined disconnection trigger event has occurred.

18. The system according to claim 17, wherein:
said first wireless interface is configured to connect said device to said second further device in response to receiving a subsequent periodic request from said second further device to connect to said device and in response to receiving said command from said second wireless interface.

* * * * *